United States Patent
Choi et al.

(10) Patent No.: US 9,451,201 B2
(45) Date of Patent: Sep. 20, 2016

(54) APPARATUS FOR OUTPUTTING BROADCAST RECORDED BY SCHEDULE RECORDING AND CONTROL METHOD THEREOF

(75) Inventors: Yoon-Hee Choi, Gyeonggi-do (KR); Hee-Seon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/451,036

(22) Filed: Apr. 19, 2012

(65) Prior Publication Data

US 2012/0269492 A1    Oct. 25, 2012

(30) Foreign Application Priority Data

Apr. 19, 2011    (KR) .................. 10-2011-0036093

(51) Int. Cl.
  H04N 5/76      (2006.01)
  H04N 5/765     (2006.01)
  H04N 9/80      (2006.01)
  H04N 7/16      (2011.01)
  H04N 5/775     (2006.01)
  H04N 21/2343   (2011.01)
  H04N 21/2747   (2011.01)
  H04N 21/242    (2011.01)
  H04N 21/258    (2011.01)
  H04N 21/81     (2011.01)

(52) U.S. Cl.
  CPC ...... *H04N 5/775* (2013.01); *H04N 21/234309* (2013.01); *H04N 21/242* (2013.01); *H04N 21/25833* (2013.01); *H04N 21/2747* (2013.01); *H04N 21/812* (2013.01)

(58) Field of Classification Search
  USPC .......... 386/200–234, 291–299; 725/86–104, 725/135–153
  See application file for complete search history.

(56) References Cited

U.S. PATENT DOCUMENTS

| 7,047,305 | B1 * | 5/2006 | Brooks et al. ............... 709/231 |
| 8,205,234 | B1   | 6/2012 | Eguchi et al. |
| 2002/0168177 | A1 * | 11/2002 | Kajitani ...................... 386/83 |
| 2002/0174442 | A1 * | 11/2002 | Nomura ....................... 725/115 |

(Continued)

FOREIGN PATENT DOCUMENTS

| EP | 1 111 796 | 6/2001 |
| JP | 2002185900 | 6/2002 |

(Continued)

OTHER PUBLICATIONS

Kahney, "Run Your Own Cloud Server With Iomega's New Home Media Drive [Review]", Apr. 18, 2011, at http://www.cultofmac.com/90512/run-your-own-cloud-server-with-iomegas-new-home-media-drive-review/.*

*Primary Examiner* — Hung Dang
(74) *Attorney, Agent, or Firm* — The Farrell Law Firm, P.C.

(57) ABSTRACT

Methods and apparatus are provided for outputting broadcast recorded by schedule recording. A schedule recording command message is received from a broadcast output apparatus at a cloud server. Broadcast data corresponding to the schedule recording command message is received. A file format used by the broadcast output apparatus is identified. The broadcast data is transcoded into the file format used by the broadcast output apparatus. The transcoded broadcast data is stored. The transcoded broadcast data is transmitted to the broadcast output apparatus when a broadcast request message is received from the broadcast output apparatus.

24 Claims, 7 Drawing Sheets

(56) References Cited

U.S. PATENT DOCUMENTS

| | | |
|---|---|---|
| 2006/0105749 A1 | 5/2006 | Han et al. |
| 2007/0124769 A1 | 5/2007 | Casey et al. |
| 2007/0162947 A1 | 7/2007 | Bertin |
| 2007/0196076 A1* | 8/2007 | Jeong et al. .................... 386/83 |
| 2008/0281685 A1* | 11/2008 | Jaffe et al. ...................... 705/14 |
| 2009/0260042 A1* | 10/2009 | Chiang ........................... 725/80 |
| 2010/0167730 A1* | 7/2010 | Shin ............................... 455/434 |
| 2010/0325674 A1* | 12/2010 | Liu ................................ 725/92 |
| 2011/0058751 A1* | 3/2011 | Shibata et al. ................. 382/233 |
| 2012/0102154 A1* | 4/2012 | Huang et al. .................. 709/219 |
| 2012/0207225 A1* | 8/2012 | Jeong ........................ 375/240.25 |

FOREIGN PATENT DOCUMENTS

| | | |
|---|---|---|
| JP | 2002-199316 | 7/2002 |
| JP | 2002-209169 | 7/2002 |
| JP | 2002-344860 | 11/2002 |
| KR | 1020060054519 | 5/2006 |
| WO | WO 01/93588 | 12/2001 |

* cited by examiner

APPARATUS FOR OUTPUTTING BROADCAST RECORDED BY SCHEDULE RECORDING AND CONTROL METHOD THEREOF

PRIORITY

This application claims the priority under 35 U.S.C. §119(a) of an application entitled "Apparatus For Outputting Broadcast Recorded By Schedule Recording And Control Method Thereof" filed in the Korean Intellectual Property Office on Apr. 19, 2011 and assigned Serial No. 10-2011-0036093, the contents of which are incorporated herein by reference.

BACKGROUND OF THE INVENTION

1. Field of the Invention

The present invention relates generally to a cloud server, a broadcast output apparatus, a broadcast output system, and corresponding control methods. More particularly, the present invention relates to a cloud server, a broadcast output apparatus, and a broadcast output system for outputting a broadcast recorded by a schedule recording, and corresponding control methods.

2. Description of the Related Art

There has been a rapid increase in the use of portable media content output apparatuses, such as, for example, smart phones and Portable Media Players (PMPs), which can be carried and can output media contents.

A user of a portable media content output apparatus can store media contents in the media content output apparatus and can view the stored media contents while the user is moving by executing the media contents at a desired time.

However, since each media content output apparatus has a set available file format, a user of the media content output apparatus should encode media contents according to the file format of the media content output apparatus and then store the encoded media contents in the media content output apparatus, before using the media contents.

Therefore, when a user wants to view particular broadcast data, the user should first acquire the broadcast data, encode the broadcast data in a particular format, and copy the encoded broadcast data into the media content output apparatus.

When a user views typical broadcast data through a broadcast receiving apparatus, such as television, there is usually no special billing attributed to the viewing. However, when a user wants to acquire special broadcast data, a user may be billed for the acquisition of the special broadcast data. Thus, the user is typically required to pay additional fees in order to view the broadcast data at a media content output apparatus.

SUMMARY OF THE INVENTION

The present invention has been made to address at least the above problems and/or disadvantages and to provide at least the advantages described below. Accordingly, an aspect of the present invention provides a cloud server, a broadcast output apparatus, and a broadcast output system for outputting a broadcast recorded by a schedule recording, and corresponding control methods in which an acquisition of a broadcast data does not require special billing.

In accordance with an aspect of the present invention, a cloud server is provided that includes a receiver for receiving a schedule recording command message from a broadcast output apparatus, and for receiving broadcast data corresponding to the schedule recording command message. The cloud server also includes a transcoder for identifying a file format used by the broadcast output apparatus, and for transcoding the broadcast data into the file format used by the broadcast output apparatus. The cloud server further includes a storage unit for storing the transcoded broadcast data, and a transmitter for transmitting the transcoded broadcast data to the broadcast output apparatus when the receiver has received a broadcast request message from the broadcast output apparatus.

In accordance with another aspect of the present invention, a cloud server is provided that includes a receiver for receiving a schedule recording command message from a first broadcast output apparatus, and for receiving broadcast data corresponding to the schedule recording command message. The cloud server also includes a transcoder for transcoding the broadcast data into broadcast data pieces having a plurality of file formats. The plurality of file formats differ from each other. The cloud server further includes a storage unit for storing the transcoded broadcast data pieces, and a processor for, when the receiver has received a broadcast request message from the second broadcast output apparatus, identifying a file format used by the second broadcast output apparatus and determining transcoded broadcast data to be transmitted from among the transcoded broadcast data pieces, based on the identified file format. Additionally, the cloud server includes a transmitter for transmitting the determined transcoded broadcast data to the second broadcast output apparatus.

In accordance with an additional aspect of the present invention, a cloud server is provided that includes a receiver for receiving a schedule recording command message from a broadcast output apparatus, and for receiving broadcast data corresponding to the schedule recording command message. The cloud server also includes a storage unit for storing the broadcast data and a reproduction program for reproducing the broadcast data. The cloud server further includes a transmitter for, when the receiver has received a broadcast request message from the broadcast output apparatus, transmitting the broadcast data and the reproduction program to the broadcast output apparatus according to a Software as a Service (SaaS) scheme.

In accordance with a further aspect of the present invention, a broadcast output apparatus is provided, which is connected to a cloud server and receives and outputs broadcast data. The broadcast output apparatus includes a user interface for receiving a schedule recording command message for storage of the broadcast data. The broadcast output apparatus also includes a transmitter for transmitting the schedule recording command message to the cloud server, and for transmitting a broadcast request message to the cloud server when the user interface has received the broadcast request message. The broadcast output apparatus further includes a receiver for receiving the broadcast data, which has been transcoded into a file format used by the broadcast output apparatus and corresponds to the schedule recording command message, from the cloud server. The broadcast output apparatus additionally includes an output unit for outputting the broadcast data.

In accordance with another aspect of the present invention, a broadcast output apparatus is provided, which is connected to a cloud server and receives and outputs broadcast data. The broadcast output apparatus includes a user interface for receiving a schedule recording command message for outputting the broadcast data, and a transmitter for transmitting the schedule recording command message to the cloud server. The broadcast output apparatus also includes a receiver for receiving broadcast data corresponding to the schedule recording command message and for receiving a reproduction program for reproducing the broadcast data from the cloud server. The broadcast output apparatus further includes an output unit for outputting the broadcast data by using the reproduction program and the broadcast data.

In accordance with another aspect of the present invention, a control method of a cloud server is provided. A schedule recording command message is received from a broadcast output apparatus. Broadcast data corresponding to the schedule recording command message is received. A file format used by the broadcast output apparatus is identified. The broadcast data is transcoded into the file format used by the broadcast output apparatus. The transcoded broadcast data is stored. The transcoded broadcast data is transmitted to the broadcast output apparatus when a broadcast request message is received from the broadcast output apparatus.

In accordance with another aspect of the present invention, a control method of a cloud server is provided. A schedule recording command message is received from a first broadcast output apparatus. Broadcast data corresponding to the schedule recording command message is received. The broadcast data is transcoded into broadcast data pieces having a plurality of file formats. The plurality of file formats differ from each other. The transcoded broadcast data pieces are stored. When a broadcast request message is received from a second broadcast output apparatus, a file format used by the second broadcast output apparatus is identified and transcoded broadcast data to be transmitted is determined from among the transcoded broadcast data pieces. The determined transcoded broadcast data is transmitted to the second broadcast output apparatus.

In accordance with another aspect of the present invention, a control method of a cloud server is provided. A schedule recording command message is received from a broadcast output apparatus. Broadcast data corresponding to the schedule recording command message is received. The broadcast data is stored. When a broadcast request message is received from the broadcast output apparatus, the broadcast data and a reproduction program for reproducing the broadcast data are transmitted to the broadcast output apparatus according to an SaaS scheme.

In accordance with another aspect of the present invention, a control method is provided for a broadcast output apparatus, which is connected to a cloud server and receives and outputs broadcast data. An input of a schedule recording command message for storage of the broadcast data is received. The schedule recording command message is transmitted to the cloud server. A broadcast request message is transmitted to the cloud server when the broadcast request message is received at the broadcast output apparatus. Broadcast data, which has been transcoded into a file format used by the broadcast output apparatus and corresponds to the schedule recording command message, is received from the cloud server. The transcoded broadcast data is output.

In accordance with another aspect of the present invention, a control method is provided for a broadcast output apparatus, which is connected to a cloud server and receives and outputs broadcast data. A schedule recording command message for outputting the broadcast data is received. The schedule recording command message is transmitted to the cloud server. The broadcast data corresponding to the schedule recording command message and a reproduction program for reproducing the broadcast data are received from the cloud server. The broadcast data is output by using the reproduction program and the broadcast data.

In accordance with another aspect of the present invention, a control method is provided for a broadcast output system that includes a cloud server and a broadcast output apparatus. An input of a schedule recording command message for storage of the broadcast data is received at the broadcast output apparatus. The schedule recording command message is transmitted from the broadcast output apparatus to the cloud server. The schedule recording command message is received at the cloud server from the broadcast output apparatus. Broadcast data corresponding to the schedule recording command message is received at the cloud server. A file format used by the broadcast output apparatus is identified at the cloud server. The broadcast data is transcoded into the file format used by the broadcast output apparatus at the cloud server. The transcoded broadcast data is stored at the cloud server. A broadcast request message is transmitted from the broadcast output apparatus to the cloud server, when the broadcast request message is received at the broadcast output apparatus. The broadcast data corresponding to the broadcast request message is transmitted from the cloud server to the broadcast output apparatus. The broadcast data is received from the cloud server at the broadcast output apparatus. The broadcast data is output by the broadcast output apparatus.

In accordance with another aspect of the present invention, a control method is provided for a broadcast output system that includes a cloud server and at least one broadcast output apparatus. An input of a schedule recording command message is received at a first broadcast output apparatus. The schedule recording command message is transmitted from the first broadcast output apparatus to the cloud server. The schedule recording command message is received at the cloud server from the first broadcast output apparatus. Broadcast data corresponding to the schedule recording command message is received at the cloud server. The broadcast data is transcoded, at the cloud server, into broadcast data pieces having a plurality of file formats. The plurality of file formats differ from each other. The transcoded broadcast data pieces are stored at the cloud server. A broadcast request message is received at a second broadcast output apparatus. The broadcast request message is transmitted from the second broadcast output apparatus to the cloud server. When the broadcast request message is received at the cloud server from the second broadcast output apparatus, a file format used by the second broadcast output apparatus is identified and transcoded broadcast data to be transmitted is determined from among the transcoded broadcast data pieces, at the cloud server. The determined transcoded broadcast data is transmitted from the cloud server to the second broadcast output apparatus. The determined transcoded broadcast data is received and output at the second broadcast output apparatus.

In accordance with another aspect of the present invention, a control method is provided for a broadcast output system that includes a cloud server and a broadcast output apparatus. An input of a schedule recording command message is received at the broadcast output apparatus. The schedule recording command message is transmitted from the broadcast output apparatus to the cloud server. The schedule recording command message is received at the cloud server. Broadcast data corresponding to the schedule recording command message is received and stored at the cloud server. When a broadcast request message is received from the broadcast output apparatus, the broadcast data and a reproduction program for reproducing the broadcast data to the broadcast output apparatus according to an SaaS scheme are transmitted by the cloud server. The broadcast data is output by using the reproduction program at the broadcast output apparatus.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
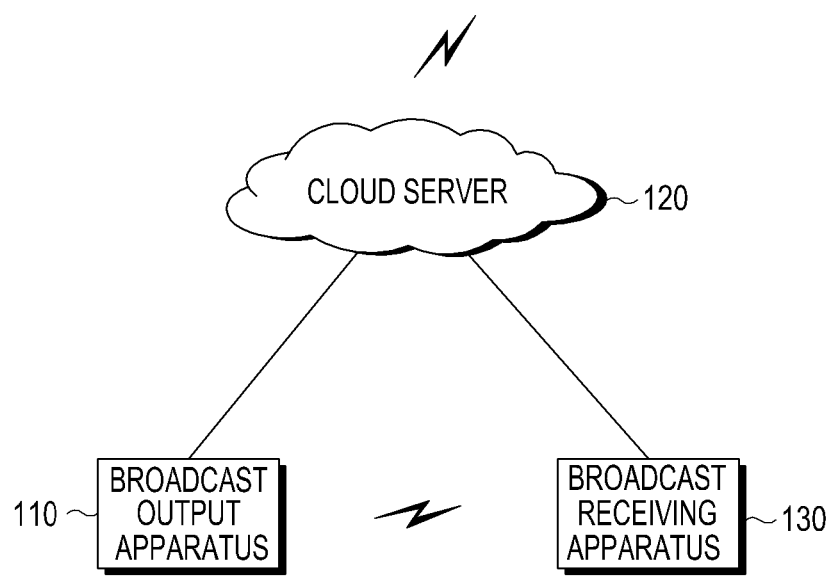
FIG. 1 is a block diagram illustrating a broadcast output system, according to an embodiment of the present invention.

Embodiments of the present invention are described in detail with reference to the accompanying drawings. The same or similar components may designated by the same or similar reference numerals although they are illustrated in different drawings. Detailed descriptions of constructions or processes known in the art may be omitted to avoid obscuring the subject matter of the present invention.

FIG. 1 is a block diagram illustrating a broadcast output system, according to an embodiment of the present invention.

As shown in FIG. 1, the broadcast output system includes a broadcast output apparatus 110, a cloud server 120, and a broadcast receiving apparatus 130.

The broadcast output apparatus 110 is capable of outputting at least one of audio and video media contents, for example. The broadcast output apparatus 110 may output, for example, broadcast data, which may include video data and audio data. The broadcast output apparatus 110 uses a specific file format according to its type. The file format may include a video file format and an audio file format. Examples of the video file format include Moving Picture Experts Group (MPEG), Audio Video Interleave (AVI), Windows Media Video (WMV), VIVO, MOV, Advanced Streaming Format (ASF), RM, RoQ, 3gp, OGG/OGM, and Yuv4mpeg. Examples of the audio file format include MP3, Compact Disc (CD) Audio, and X MultiMedia System (XMMS).

The broadcast output apparatus 110 transmits/receives information to/from the cloud server 120 or the broadcast receiving apparatus 130. The broadcast output apparatus 110 includes a transmitting means for transmitting a data packet and a receiving means for receiving a data packet. The broadcast output apparatus may be configured to include a single antenna and a duplexer. The receiving/transmitting means of the broadcast output apparatus 110 are described in a greater detail below.

The broadcast output apparatus 110 transmits a schedule recording command message to the cloud server 120 or the broadcast receiving apparatus 130. This schedule recording command instructs the cloud server 120 or the broadcast receiving apparatus 130 to perform a schedule recording of particular broadcast data at an appointed time. The schedule recording command message may include information on the particular broadcast data to be recorded by the schedule recording, information on a channel through which the broadcast data is received, information on a time at which the broadcast data is broadcasted, and information on a file format used by the broadcast output apparatus.

The cloud server 120 relays the schedule recording command message received from the broadcast output apparatus 110 to the broadcast receiving apparatus 130.

The broadcast output apparatus 110 receives broadcast data recorded based on the schedule recording command message from the cloud server 120.

Further, the broadcast output apparatus 110 outputs media contents, for example, the received audio and/or video broadcast data using the file format of the broadcast output apparatus 110.

The cloud server 120 receives a schedule recording command message from the broadcast output apparatus 110. The cloud server 120 relays the schedule recording command message to the broadcast receiving apparatus 130.

Based on the schedule recording command message, the cloud server 120 instead may directly receive the broadcast data corresponding to the schedule recording command message.

The cloud server 120 may be operated based on a cloud service. The cloud service has a central server constructed based on the Internet and provides user-required services, such as, for example, software, infrastructure, and platforms. A service that provides software resources may be referred to as a Software as a Service (SaaS), a service that provides infrastructure resources may be referred to as an Infrastructure as a Service (IaaS), and a service that provides platform resources may be referred to as a Platform as a Service (PaaS). The cloud server 120 may provide a user terminal with software, which the user terminal does not possess, according to an SaaS scheme, so as to maximize user convenience.

Based on the schedule recording command message received from the broadcast output apparatus 110 or the cloud server 120, the broadcast receiving apparatus 130 receives and stores the broadcast data corresponding to the schedule recording command message. As described above, the schedule recording command message received by the broadcast receiving apparatus 130 includes information on the time and channel for receiving the broadcast data. Based on this information, the broadcast receiving apparatus 130 can receive the broadcast data corresponding to the schedule recording command message through a proper adjustment of the receiving channel and receiving time.

The broadcast receiving apparatus 130 may be embodied as an Internet Protocol TeleVision (IPTV). However, the broadcast receiving apparatus 130 may be configured in any manner that allows the broadcast receiving apparatus 130 to receive analog broadcast data and convert the received broadcast data from analog data to digital data.

The broadcast receiving apparatus 130 transmits the stored broadcast data to the cloud server 120.

The cloud server 120 encodes the stored broadcast data into a file format used by the broadcast output apparatus 110, or encodes the broadcast data into a plurality of file formats used by the cloud server 120 or the broadcast output apparatus 110. The cloud server 120 may also transcode the broadcast data. Transcoding is a process of decoding broadcast data described according to a particular file format, i.e., broadcast data is compressed by a codec based on a particular compression standard or compression scheme, and then the decoded broadcast data is encoded by a new codec. The encoding or transcoding of the broadcast data by the cloud server 120 is described in greater detail below.

The cloud server 120 identifies the file format used by the broadcast output apparatus 110 and encodes the broadcast data according to the identified file format. Upon receiving a broadcast request message from the broadcast output apparatus 110, the cloud server 120 transmits the encoded broadcast data to the broadcast output apparatus 110.

The broadcast output apparatus 110 outputs the encoded audio and/or video broadcast data received from the cloud server 120.

As a result, when a user views a special broadcast, the user can avoid payment of additional expenses for acquiring broadcast data for the special broadcast. Further, since the broadcast data has been encoded in a proper format by the cloud server 120, the user need not perform encoding. Accordingly, the Internet-based cloud server solves the problem of distance restrictions and the problem of insufficient storage space due to the capacity of the media contents.

Figure 2:
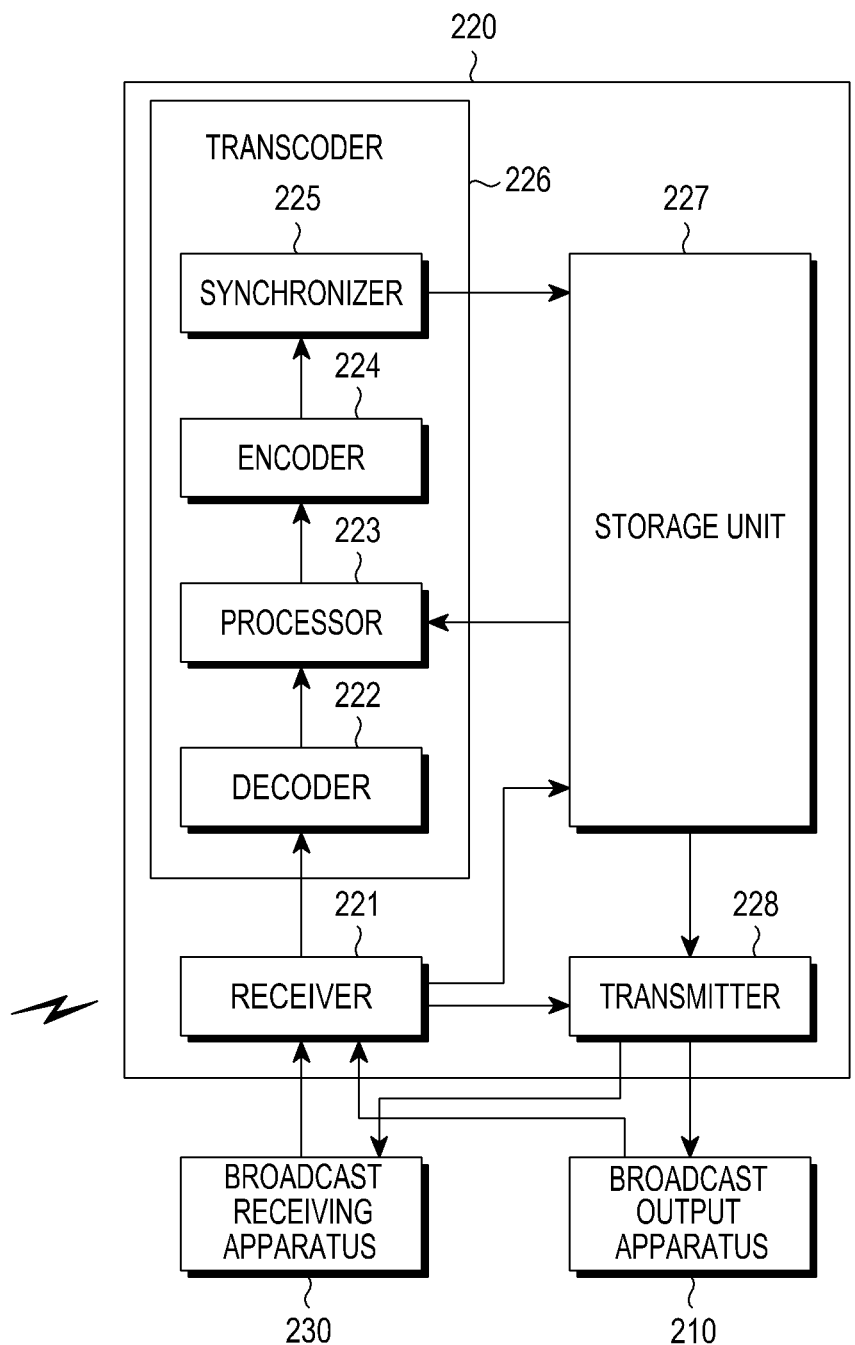
FIG. 2 is a block diagram illustrating a broadcast output apparatus, a broadcast receiving apparatus, and a cloud server, according to an embodiment of the present invention.

FIG. 2 is a block diagram illustrating a broadcast output apparatus, a broadcast receiving apparatus, and a cloud server, according to an embodiment of the present invention.

As shown in FIG. 2, the cloud server 220 includes a receiver 221, a transcoder 226, a storage unit 227, and a transmitter 228. The transcoder 226 includes a decoder 222, a processor 223, an encoder 224, and a synchronizer 225.

The receiver 221 receives a schedule recording command message from the broadcast output apparatus 210. The receiver 221 outputs the received schedule recording command message to the transmitter 228. The transmitter 228 transmits the schedule recording command message received from the receiver 221 to the broadcast receiving apparatus 230.

The broadcast receiving apparatus 230 receives the broadcast data corresponding to the received schedule recording command message and transmits the broadcast data to the receiver 221.

The receiver 221 of the cloud server 220, according to another embodiment of the present invention, receives the broadcast data corresponding to the received schedule recording command message directly from a broadcasting station, based on the received schedule recording command message.

The receiver 221 outputs the received broadcast data to the transcoder 226.

The transcoder 226 transcodes the input broadcast data into a file format used by the broadcast output apparatus 210.

As described above, the schedule recording command message may include information on the file format used by the broadcast output apparatus 210, and the transcoder 226 may transcode the received broadcast data by referring to the file format information included in the schedule recording command message.

The transcoder 226, according to another embodiment of the present invention, reads out a lookup table stored in the storage unit 227, which shows the relation between broadcast output apparatuses and file formats used by the broadcast output apparatuses, and transcodes the received broadcast data by referring to the lookup table.

Table 1 shows an example of a lookup table stored in the storage unit 227, according to an embodiment of the present invention.

TABLE 1

| Broadcast output apparatus type | | File format |
|---|---|---|
| 1$^{st}$ broadcast output apparatus | Video format | MPEG4, H.264, DivX, XviD, WMV |
| | Audio format | MP3, WMA9, Ogg, Fla |
| 2$^{nd}$ broadcast output apparatus | Video format | MPEG4, H.264 |
| | Audio format | AAC LC |
| 3$^{rd}$ broadcast output apparatus | Video format | AVI, XviD |
| | Audio format | MPEG-1 |

The transcoder 226 may transcode the broadcast data into a video format and an audio format used by the broadcast output apparatus 210, by referring to the lookup table stored in the storage unit 227, as shown in Table 1.

As described above, the transcoder 226 includes the decoder 222, the processor 223, the encoder 224, and the synchronizer 225.

The decoder 222 decodes broadcast data compressed by a codec based on a particular compression standard or compression scheme. More specifically, the decoder 222 divides broadcast data into video data and audio data, and decodes each of the divided video data and audio data.

For example, if the broadcast data received by the broadcast receiving apparatus 230 or the receiver 221 has been encoded according to a video format of AVI and an audio format of MPEG-1, and if the video format used by the broadcast output apparatus 210 is MPEG-4 and the audio format used by the broadcast output apparatus 210 is MP3, the decoder 222 may decode the broadcast data encoded according to the video format of AVI and the audio format of MPEG-1. The decoded broadcast data is output to the processor 223.

When the file format of the broadcast data received by the broadcast receiving apparatus 230 or the receiver 221 coincides with the file format used by the broadcast output apparatus 210, the decoder 222 directly stores the broadcast data in the storage unit 227 without decoding the broadcast data.

The processor 223 determines a particular file format for encoding of the decoded broadcast data. By referring to the lookup table read out from the storage unit 227, which contains the relation between the broadcast output apparatuses and file formats used by the broadcast output apparatuses, the processor 223 determines the file format for the encoding. Otherwise, by using the information on the file format included in the schedule recording command message, the processor 223 determines the file format for the encoding.

For example, if the schedule recording command message includes information that the broadcast output apparatus is an MP4 player, the processor 223 may read out a lookup table as shown in Table 1, which has been stored in the storage unit 227, and determine the video format to be AVI and the audio format to be MPEG-1.

The encoder 224 encodes the decoded broadcast data into a file format for encoding determined by the processor 223. Specifically, the encoder 224 encodes each of the decoded video data and the decoded audio data into a file format for encoding determined by the processor 223. If the broadcast output apparatus 210 is an MP4 player as in the example described above, the encoder 224 encodes the decoded video data into an AVI video format and encodes the decoded audio data into an MPEG-1 audio format.

The encoder 224 outputs the encoded video data and the encoded audio data to the synchronizer 225.

The synchronizer 225 synchronizes the encoded video data and the encoded audio data received from the encoder 224 to generate encoded video data, which is output to the storage unit 227.

The storage unit 227 stores the encoded video data input from the synchronizer 225. When it is unnecessary to transcode the broadcast data as described above, the storage unit 227 directly stores the video data input from the receiver 221. Further, the storage unit 227 may store a decoding algorithm used by the decoder 222, a lookup table and a file format determining algorithm used by the processor 223, an encoding algorithm used by the encoder 224, or a synchronization algorithm used by the synchronizer 225. As described in greater detail below, the storage unit 227 may store a call-back function for outputting encoded broadcast data or broadcast data information stored in the storage unit 227 to the transmitter 228 by using the event of receiving a broadcast request message from the broadcast output apparatus 210 as a trigger. The storage unit 227 may be embodied as a Random Access Memory (RAM), Read Only Memory (ROM), or Electrically Erasable Programmable ROM (EEPROM), for example, but other storage unit types may be utilized that are also capable of performing the functions described above.

A user of the broadcast output apparatus 210 may operate the broadcast output apparatus 210 to make the broadcast output apparatus 210 transmit a broadcast request message to the cloud server 220 at a time point at which the user wants to view a particular broadcast. The broadcast request message may include a broadcast data identifier, such as a filename, which can identify the broadcast data.

The broadcast output apparatus 210, according to another embodiment of the present invention, may receive encoded broadcast data or broadcast data information stored in the storage unit 227 from the cloud server 220, output the data or data information so that the user can identify the data or data information, and then receive a broadcast request message from the user.

When the receiver 221 receives a broadcast request message from the broadcast output apparatus 210, a call-back function using the reception of a broadcast request message as an event may be executed. As a result of the execution of the call-back function, the transmitter 228 may transmit the encoded broadcast data or broadcast data information corresponding to the broadcast request message to the broadcast output apparatus 210.

The broadcast output apparatus 210 outputs the encoded broadcast data or broadcast data information received from the transmitter 228.

According to the embodiments of the present invention described above, the user can easily access a cloud server and receive and view broadcast data at a desired time, even at an outside of a home network area. Further, an additional expense for acquiring the broadcast data is not required, and separate encoding of the broadcast data by a user is unnecessary.

Figure 3:
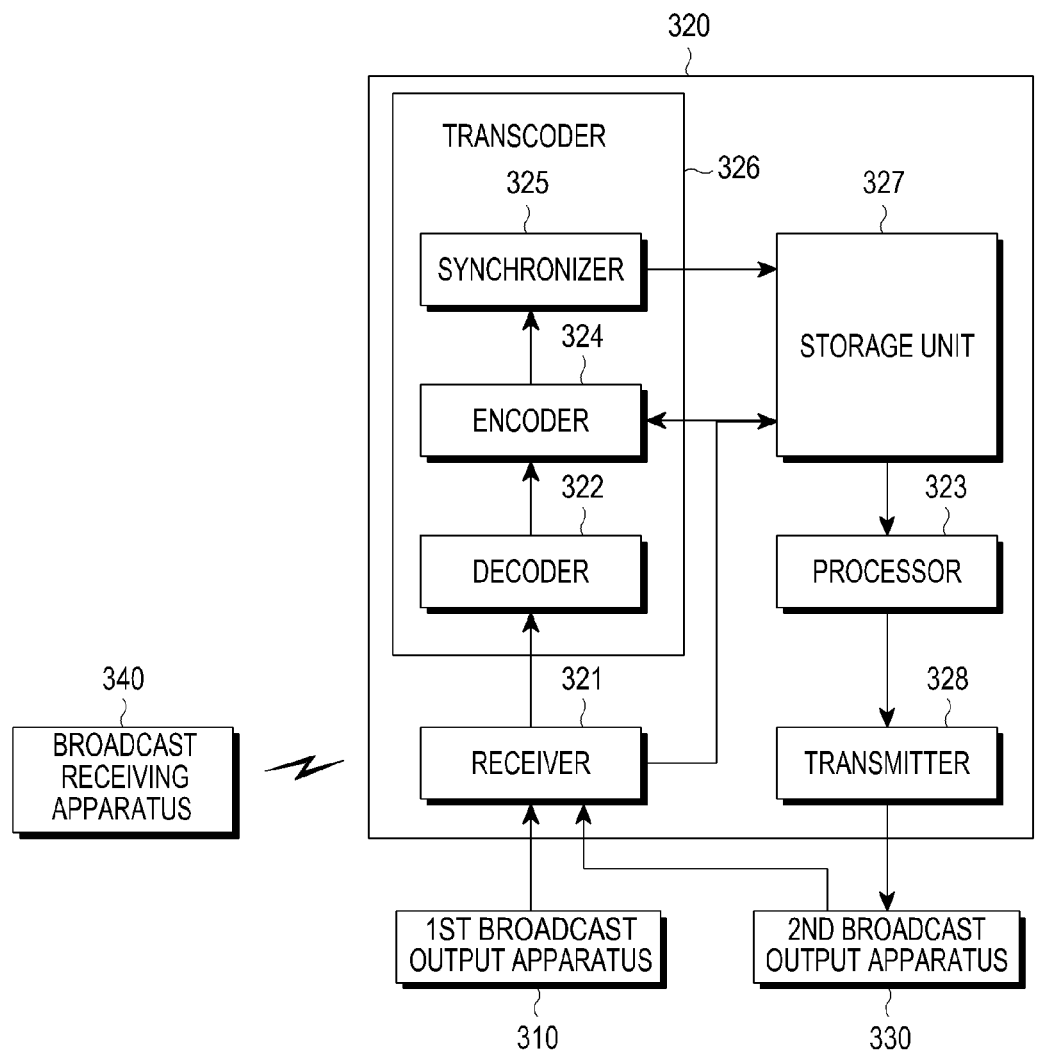
FIG. 3 is a block diagram illustrating a cloud server, according to an embodiment of the present invention.

FIG. 3 is a block diagram of a cloud server, according to another embodiment of the present invention.

As shown in FIG. 3, a cloud server 320 includes a receiver 321, a decoder 322, a processor 323, an encoder 324, a synchronizer 325, a transcoder 326, a storage unit 327, and a transmitter 328.

The cloud server 320 is connected to a first broadcast output apparatus 310 or a second broadcast output apparatus 330 through a wire or a wireless Internet medium. Unlike the embodiment of the present invention illustrated in FIG. 2, the first broadcast output apparatus 310, for transmitting a schedule recording command message, and the second broadcast output apparatus 330, for transmitting a broadcast request message and receiving broadcast data, may be different from each other.

The receiver 321 may receive a schedule recording command message from the first broadcast output apparatus 310.

Based on the received schedule recording command message, the receiver 321 receives broadcast data corresponding to the schedule recording command message either from a broadcast receiving apparatus 340 or directly from a broadcasting station. The broadcast data received by the receiver 321 is output to the transcoder 326.

The transcoder 326 includes the decoder 322, the encoder 324, and the synchronizer 325.

The decoder 322 decodes the broadcast data input from the receiver 321. As described above, the broadcast data has been compressed by a codec based on a particular compression standard or compression scheme, and the decoder 322 decodes the broadcast data compressed by a codec based on a particular compression standard or compression scheme. As described above, the decoder 322 divides the broadcast data into video data and audio data and before decoding each.

Unlike the decoder 222 of FIG. 2, which does not decode broadcast data having the same file format as a file format used by a particular broadcast output apparatus, the decoder 322 of FIG. 3 performs decoding for all broadcast data. The broadcast data decoded by the decoder 322 is output to the encoder 324.

The encoder 324 encodes the input decoded broadcast data into a plurality of file formats. The plurality of file formats and an encoding algorithm for the encoding into the plurality of file formats may be read out from the storage unit 327, and the encoder 324 may generate broadcast data encoded into the plurality of file formats different from each other for single broadcast data. Specifically, for a pair of video data and audio data, the encoder 324 generates broadcast data encoded into multiple pairs of file formats, which are different from each other.

Before encoding the video data and audio data into the file formats, the encoder 324 may insert a commercial in the video data and audio data. The commercial may be inserted in the video data and audio data according to a pre-roll method, a mid-roll method, or a post-roll method. A service provider can then expect additional profit.

The synchronizer 325 synchronizes the video data and audio data encoded into the multiple pairs of file formats, which have been received from the encoder 324, so as to generate broadcast data encoded into multiple pairs of file formats, which are different from each other. The broadcast data encoded into multiple pairs of file formats, which has been generated by the synchronizer 325, is stored in the storage unit 327.

The storage unit 327 stores the broadcast data encoded into the multiple pairs of file formats as described above. Further, as described above, the storage unit 327 may store a call-back function using an event, in which the receiver 321 receives a broadcast request message from the second broadcast output apparatus 330, as a trigger. Moreover, the storage unit 327 may store a lookup table showing the relation between broadcast output apparatuses and file formats used by the broadcast output apparatuses.

According to the user's operation, the second broadcast output apparatus 330 may transmit a broadcast request message, which requests transmission of particular broadcast data, to the cloud server 320. The broadcast request message includes an identifier for identifying the broadcast, transmission of which is requested, information on the file format used by the second broadcast output apparatus, or an identifier for identifying the second broadcast output apparatus.

When an event occurs, in which the receiver 321 receives a broadcast request message, the processor 323 determines the encoded broadcast data to be output to the second broadcast output apparatus 330, from among the broadcast data stored in the storage unit 327, which have been encoded into the multiple pairs of file formats.

By referring to the lookup table read out from the storage unit 327, which shows the relation between broadcast output apparatuses and file formats used by the broadcast output apparatuses, the processor 323 can determine the file format for the encoding. Otherwise, by using the file format information included in the broadcast request message, the processor 323 can determine the encoded broadcast data to be transmitted to the second broadcast output apparatus 330.

For example, if the broadcast request message includes information that the second broadcast output apparatus 330 is an MP4 player, the processor 323 reads out a lookup table as shown in Table 1, which has been stored in the storage unit 327, and determines broadcast data, which has been encoded in a video format of AVI and an audio format of MPEG-1, as the broadcast data to be transmitted to the second broadcast output apparatus 330.

The transmitter 328 transmits the broadcast data, which has been determined to be transmitted by the processor 323, to the second broadcast output apparatus 330.

The second broadcast output apparatus 330 outputs at least one of received audio and video broadcast data according to the user's operation.

According to an embodiment of the present invention, a schedule recording command message is transmitted through the first broadcast output apparatus 310 and desired broadcast data is received through the second broadcast output apparatus 330, which is different from the first broadcast output apparatus 310. Further, since the storage unit 327 stores broadcast data encoded according to various file formats, it is possible to maximize the adaptability to the change of the second broadcast output apparatus 330 using a certain file format, so that the user can access the cloud server and acquire broadcast data from the cloud server by using various media content output apparatuses.

Figure 4:
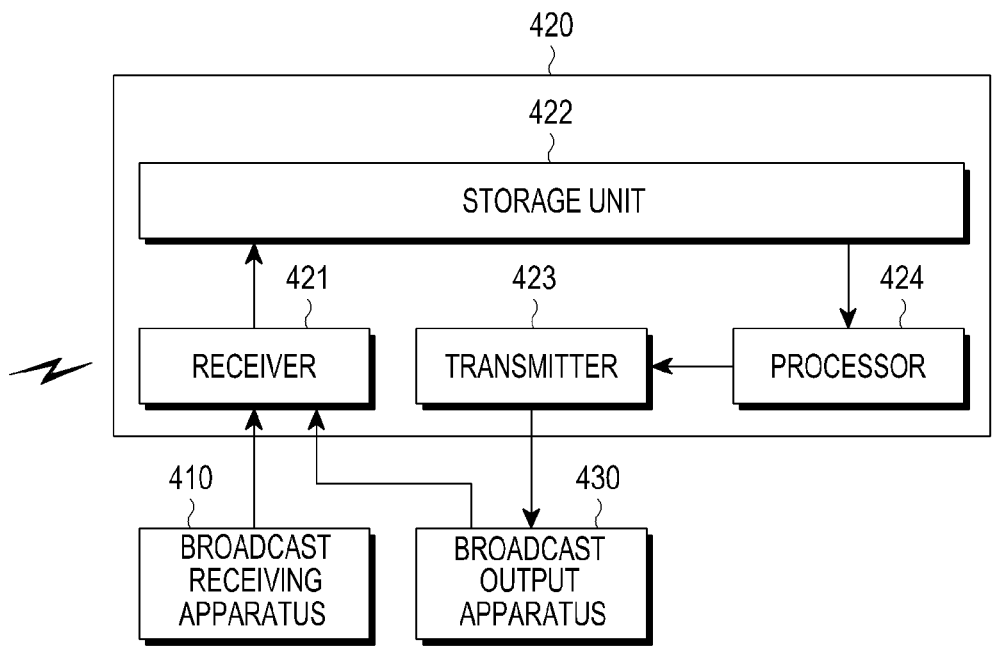
FIG. 4 is a block diagram illustrating a cloud server, according to another embodiment of the present invention.

FIG. 4 is a block diagram illustrating a cloud server, according to another embodiment of the present invention.

As shown in FIG. 4, a cloud server 420 includes a receiver 421, a storage unit 422, a transmitter 423, and a processor 424. The cloud server 420 is connected to at least one of a broadcast receiving apparatus 410 and a broadcast output apparatus 430 through wired or wireless communication.

The receiver 421 receives a schedule recording command message from the broadcast output apparatus 430.

When the receiver 421 has received a schedule recording command message, the receiver 421 may directly receive broadcast data corresponding to the schedule recording command message from the broadcast receiving apparatus 410 or a broadcasting station based on the schedule recording command message. The construction for receiving broadcast data corresponding to the schedule recording command message based on the schedule recording command message by the receiver 421 has been described in detail above. The received broadcast data is output to the storage unit 422.

The storage unit 422 stores the received broadcast data. Further, the storage unit 422 stores a reproduction program for reproducing the received broadcast data. In order to make it possible to reproduce all broadcast data regardless of the file format, the storage unit 422 stores a plurality of reproduction programs. Further, the storage unit 422 may store a lookup table, which shows the relation between file formats of broadcast data and reproduction programs capable of reproducing broadcast data of particular file formats.

Further, the storage unit 422 may store a call-back function for outputting broadcast data and a reproduction program for reproducing the broadcast data to the transmitter 423 by using an event, in which the receiver 421 receives a broadcast request message from the broadcast output apparatus 430, as a trigger.

When the receiver 421 has received a broadcast request message from the broadcast output apparatus 430, the processor 424 may identify the file format of the broadcast data stored in the storage unit 422 and determine a reproduction program to be used for reproduction of the broadcast data. For example, the processor 424 may determine the reproduction program to be used for reproduction of the broadcast data by referring to the lookup table stored in the storage unit 422, which shows the relation between file formats of broadcast data and reproduction programs capable of reproducing broadcast data of particular file formats.

The transmitter 423 reads out the broadcast data and the reproduction program determined by the processor 424 and transmits them to the broadcast output apparatus 430. The construction for transmission of the reproduction program to the broadcast output apparatus 430 by the transmitter 423 may be implemented according to an SaaS scheme, in which case the broadcast output apparatus 430 can output broadcast data without a separate reproduction program. Further, since a reproduction program capable of reproducing a file format of received broadcast data is transmitted to the broadcast output apparatus 430, it is possible to omit the job of transcoding the broadcast data into a file format used by the broadcast output apparatus.

The cloud server 420 may further include a processor that inserts a commercial in the received broadcast data.

Figure 5:
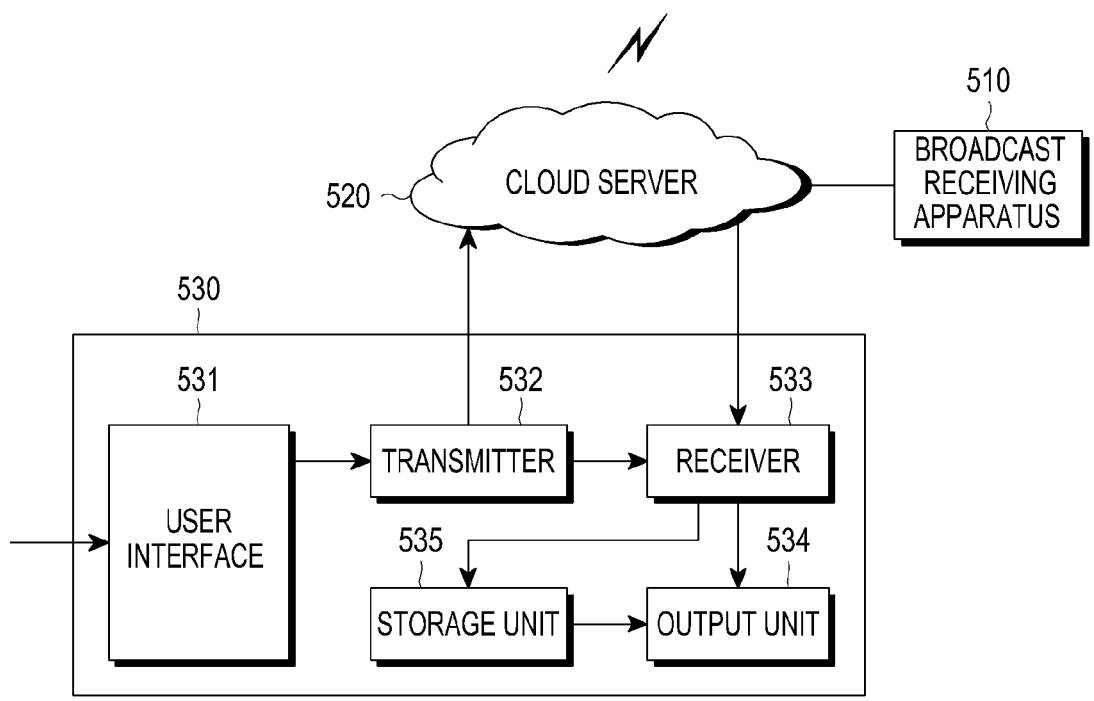
FIG. 5 is a block diagram illustrating a broadcast output apparatus, according to an embodiment of the present invention.

FIG. 5 is a block diagram illustrating a broadcast output apparatus, according to an embodiment of the present invention.

As shown in FIG. 5, a broadcast output apparatus 530 includes a user interface 531, a transmitter 532, a receiver 533, an output unit 534, and a storage unit 535.

The user interface 531 receives a schedule recording command message, input by a user, which issues a command for a schedule recording of a particular broadcast data and storage of the recorded broadcast data in the cloud server. The schedule recording command message may include information on the particular broadcast data to be recorded by the schedule recording, information on a channel through which the broadcast data is received, information on a time at which the broadcast data is broadcasted, and information on a file format used by the broadcast output apparatus.

The transmitter 532 transmits the schedule recording command message to the cloud server 520. Based on the received schedule recording command message, the cloud server 520 receives broadcast data corresponding to the schedule recording command message. As described above, the cloud server 520 may receive the broadcast data from the broadcast receiving apparatus 510 or directly from a broadcasting station.

The user interface 531 receives an input of a broadcast request message from a user. The broadcast request message may include a broadcast data identifier, such as a filename of the broadcast request message, which can identify the broadcast data.

The transmitter 532 transmits the broadcast request message to the cloud server 520, and the cloud server 520 transmits encoded broadcast data or broadcast data information corresponding to the broadcast request message to the receiver 533.

The receiver 533 outputs the received encoded broadcast data or broadcast data information to the storage unit 535, and the storage unit 535 stores the encoded broadcast data or broadcast data information.

Thereafter, according to the user's operation, the output unit 534 reads out the encoded broadcast data or broadcast data information from the storage unit 535 and outputs the broadcast data or broadcast data information in the form of at least one of audio and video data.

The storage unit 535 stores the encoded broadcast data or broadcast data information and stores a reproduction program for reproducing the encoded broadcast data or broadcast data information. The broadcast output apparatus 530, according to another embodiment of the present invention, receives the reproduction program for reproducing the encoded broadcast data or broadcast data information from the cloud server 520, according to an SaaS scheme. The broadcast output apparatus 530 then stores the received reproduction program in the storage unit 535, instead of storing the reproduction program for reproducing the encoded broadcast data or broadcast data information in the storage unit 535 in advance.

Figure 6:
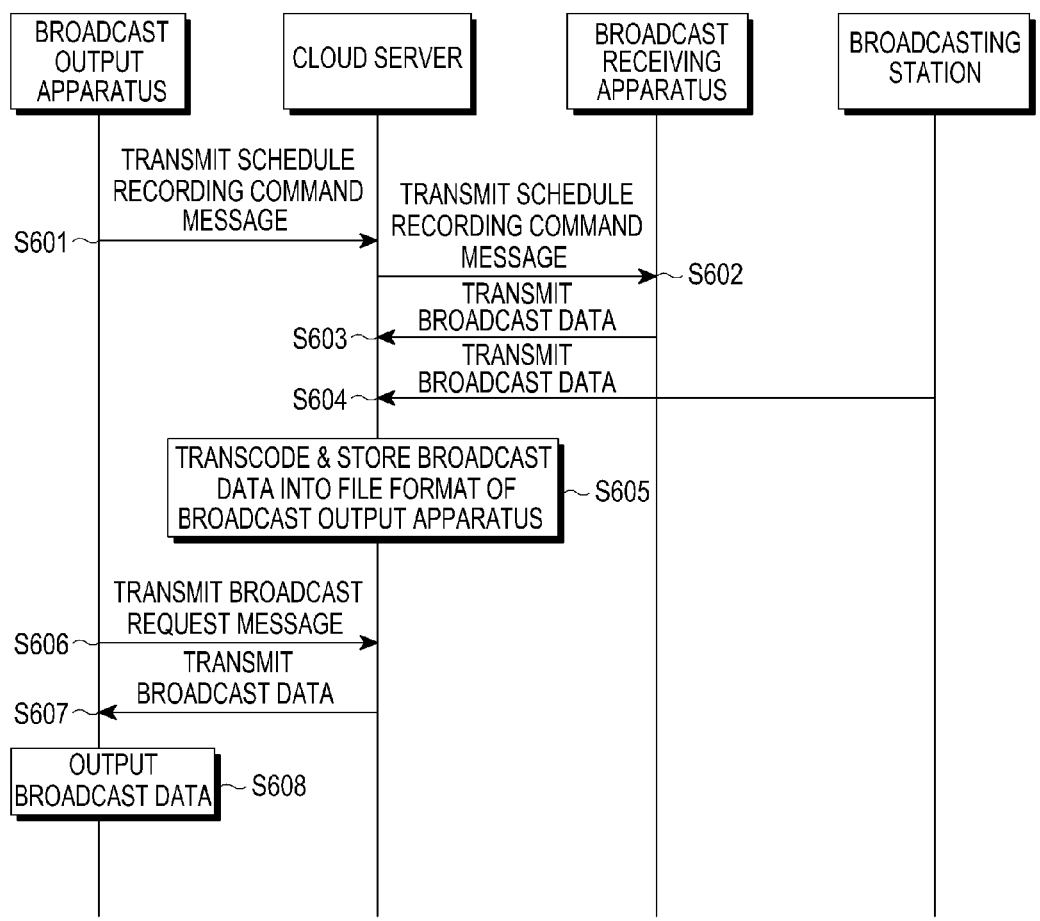
FIG. 6 is a signal flow diagram illustrating a control method of a broadcast output system, according to an embodiment of the present invention.

FIG. 6 is a signal flow diagram illustrating a control method of a broadcast output system, according to an embodiment of the present invention.

As shown in FIG. 6, a broadcast output apparatus transmits a schedule recording command message to a cloud server, in step S601. As described above, the schedule recording command message may include information on the particular broadcast data to be recorded by the schedule recording, information on a channel through which the broadcast data is received, information on a time at which the broadcast data is broadcasted, and information on a file format used by the broadcast output apparatus.

The cloud server relays the schedule recording command message to the broadcast receiving apparatus, in step S602. Based on the received schedule recording command message, the broadcast receiving apparatus acquires and stores broadcast data corresponding to the schedule recording command message and then transmit the broadcast data to the cloud server, in step S603.

As an alternate to steps S602 and S603, based on the received schedule recording command message, the cloud server directly receives the broadcast data from a broadcasting station, in step S604.

The cloud server transcodes the received broadcast data into a file format used by the broadcast output apparatus and then stores the transcoded broadcast data, in step S605. The transcoding of the broadcast data received by the cloud server has been described above in detail above.

The broadcast output apparatus transmits a broadcast request message to the cloud server, in step S606. Based on the received broadcast request message, the cloud server transmits the stored transcoded broadcast data to the broadcast output apparatus, in step S607.

The broadcast output apparatus outputs the received broadcast data, in step S608.

According to the description of FIG. 6 above, the user can easily access the cloud server and receive and view broadcast data at a desired time, even outside of a home network area. Further, an additional expense for acquiring the broadcast data is not required, and separate encoding of broadcast data by a user is unnecessary.

Figure 7:
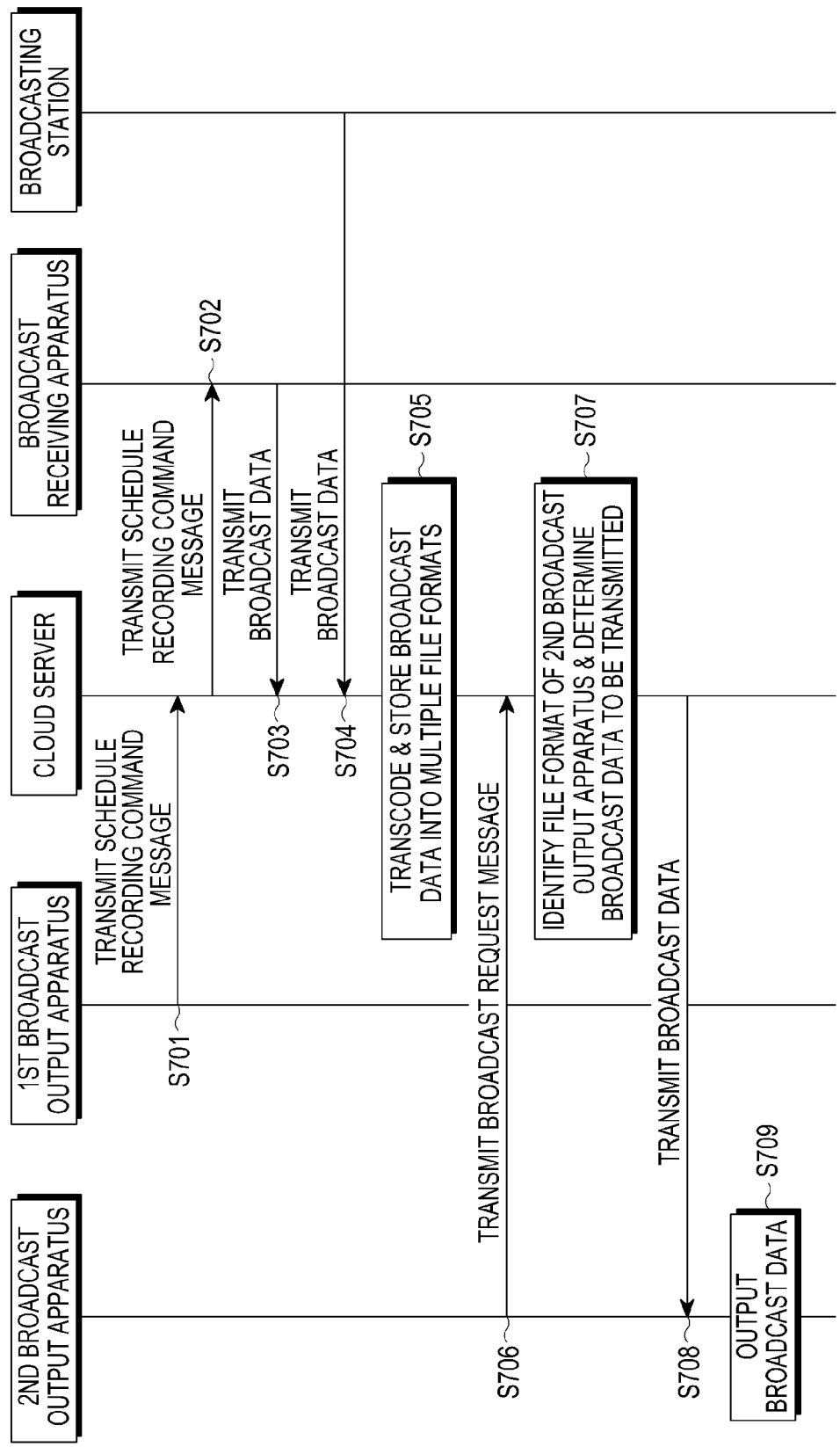
FIG. 7 is a signal flow diagram illustrating a control method of a broadcast output system, according to another embodiment of the present invention.

FIG. 7 is a signal flow diagram illustrating a control method of a broadcast output system, according to another embodiment of the present invention.

A first broadcast output apparatus transmits a schedule recording command message to a cloud server, in step S701.

The cloud server relays the received schedule recording command message to the broadcast receiving apparatus, in step S702. Based on the received schedule recording command message, the broadcast receiving apparatus acquires and stores broadcast data corresponding to the schedule recording command message and then transmits the broadcast data to the cloud server, in step S703.

As an alternate to steps S702 and S703, based on the received schedule recording command message, the cloud server directly receives the broadcast data from a broadcasting station, in step S704.

The cloud server transcodes the received broadcast data into a plurality of file formats used by the broadcast output apparatus and then stores the transcoded broadcast data, in step S705. The transcoding of the broadcast data received by the cloud server has been described in detail above.

The second broadcast output apparatus transmits a broadcast request message to the cloud server, in step S706. Based on the received broadcast request message, the cloud server determines broadcast data to be transmitted to the second broadcast output apparatus among the stored multiple pieces of transcoded broadcast data, in step S707. The determining of the broadcast data to be transmitted to the second broadcast output apparatus by the cloud server has been described in detail above.

The cloud server transmits the determined broadcast data to the second broadcast output apparatus, in step S708.

The second broadcast output apparatus outputs the received broadcast data, in step S709.

According to the description of FIG. 7, it is possible to transmit a schedule recording command message through the first broadcast output apparatus and view desired broadcast data through the second broadcast output apparatus, which is different from the first broadcast output apparatus. Further, since the cloud server stores broadcast data encoded according to various file formats, it is possible to maximize the adaptability to the change of the second broadcast output apparatus using a certain file format, so that the user can access the cloud server and acquire broadcast data from the cloud server by using various media content output apparatuses.

Figure 8:
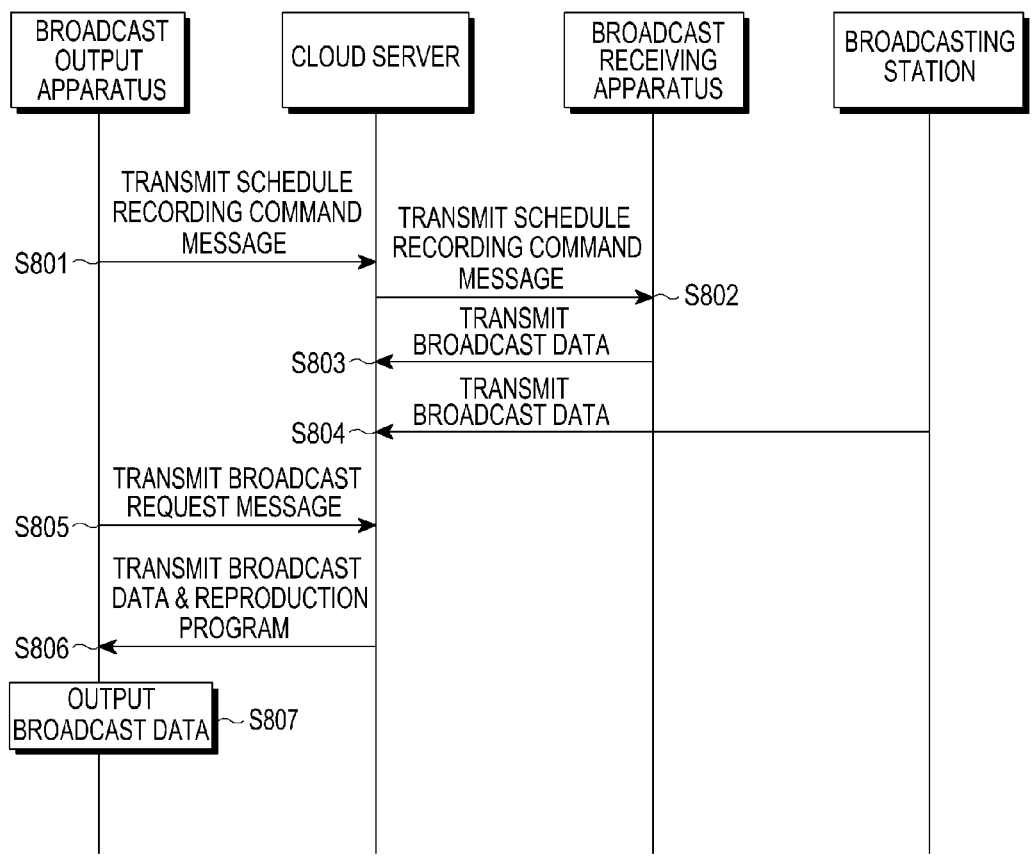
FIG. 8 is a signal flow diagram illustrating a control method of a broadcast output system, according to another embodiment of the present invention.

FIG. 8 is a signal flow diagram illustrating a control method of a broadcast output system, according to another embodiment of the present invention.

As shown in FIG. 8, a broadcast output apparatus transmits a schedule recording command message to a cloud server, in step S801. As described above, the schedule recording command message may include information on the particular broadcast data to be recorded by the schedule recording, information on a channel through which the broadcast data is received, information on a time at which the broadcast data is broadcasted, and information on a file format used by the broadcast output apparatus.

The cloud server relays the schedule recording command message to the broadcast receiving apparatus, in step S802. Based on the received schedule recording command message, the broadcast receiving apparatus acquires and stores broadcast data corresponding to the schedule recording command message and then transmits the broadcast data to the cloud server, in step S803.

As an alternate to steps S802 and S803, based on the received schedule recording command message, the cloud server directly receives the broadcast data from a broadcasting station, in step S804.

The broadcast output apparatus transmits the broadcast request message to the cloud server, in step S805. Based on the received broadcast request message, the cloud server transmits stored broadcast data and a reproduction program capable of reproducing the broadcast data to the broadcast output apparatus, in step S806.

The broadcast output apparatus outputs the received broadcast data, in step S807.

As a result, the broadcast output apparatus can output broadcast data without a separate reproduction program. Further, since a reproduction program previously stored in the cloud server capable of reproducing a file format of the received broadcast data is transmitted to the broadcast output apparatus, it is possible to omit the transcoding of the broadcast data into a file format used by the broadcast output apparatus.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A cloud server comprising:
   a receiver for receiving a schedule recording command message from a broadcast output apparatus, and for receiving broadcast data corresponding to the schedule recording command message through wireless communication;
   a transcoder for identifying a file format used by the broadcast output apparatus, and for transcoding the broadcast data into the file format used by the broadcast output apparatus;
   a storage unit for storing the transcoded broadcast data, for storing a lookup table defining relationships between the broadcast output apparatus which sent the schedule recording command message and the file format used by the broadcast output apparatus, and for storing a call-back function for outputting the transcoded broadcast data to the broadcast output apparatus by using an event of receiving a broadcast request message from the broadcast output apparatus as a trigger; and
   a transmitter for transmitting the transcoded broadcast data to the broadcast output apparatus, when the receiver has received the broadcast request message from the broadcast output apparatus through wireless communication outside of a home network area,
   wherein the transcoder identifies the file format used by the broadcast output apparatus by referring to the lookup table defining relationships between the broadcast output apparatus and the file format used by the broadcast output apparatus, and read out from the storage unit, and transcodes the broadcast data using the lookup table,
   wherein the transmitter relays the schedule recording command message to a broadcast receiving apparatus through wireless communication,
   wherein the receiver receives the broadcast data corresponding to the schedule recording command message from the broadcast receiving apparatus, through wireless communication, and
   wherein the receiver, transcoder, storage unit and transmitter are comprised in the cloud server.

2. The cloud server of claim 1, wherein the broadcast data has been recorded in the broadcast receiving apparatus in response to the schedule recording command message.

3. The cloud server of claim 1, wherein the receiver receives the broadcast data from a broadcasting station based on the schedule recording command message.

4. The cloud server of claim 1, wherein the transcoder comprises:
   a decoder for dividing the broadcast data into video data and audio data, and for decoding each of the video data and the audio data;
   a processor for identifying the file format used by the broadcast output apparatus;
   an encoder for encoding the decoded video data and the decoded audio data into the file format used by the broadcast output apparatus; and
   a synchronizer for synchronizing the encoded video data and the encoded audio data, so as to generate the transcoded broadcast data.

5. The cloud server of claim 4, wherein the broadcast request message comprises information on the file format used by the broadcast output apparatus, and
   the processor identifies the file format used by the broadcast output apparatus by referring to the information on the file format in the broadcast request message.

6. The cloud server of claim 1, wherein the transcoder inserts a commercial into the broadcast data before transcoding the broadcast data into the file format.

7. The cloud server of claim 6, wherein the commercial is based on a pre-roll method, a mid-roll method, or a post-roll method.

8. A cloud server comprising:
   a receiver for receiving a schedule recording command message from a first broadcast output apparatus, and for receiving broadcast data corresponding to the schedule recording command message through wireless communication;
   a transcoder for transcoding the broadcast data into broadcast data pieces having a plurality of file formats, wherein the plurality of file formats differ from each other;
   a storage unit for storing the transcoded broadcast data pieces, for storing a lookup table defining relationships between the broadcast output apparatus which sent the schedule recording command message and the file format used by the broadcast output apparatus, and for storing a call-back function for outputting the transcoded broadcast data to the broadcast output apparatus by using an event of receiving a broadcast request message from the broadcast output apparatus as a trigger;
   a processor for, when the receiver has received the broadcast request message from the second broadcast output apparatus, identifying a file format used by the second broadcast output apparatus and determining transcoded broadcast data to be transmitted, from among the transcoded broadcast data pieces, based on the identified file format; and a transmitter for transmitting the transcoded broadcast data to the second broadcast output apparatus through wireless communication outside of a home network area, wherein the transcoder identifies the file format used by the broadcast output, in accordance with the lookup table defining relationships between the broadcast output apparatus and the file format used by the broadcast output apparatus, and read out from the storage unit, and transcodes the broadcast data using the lookup table, wherein the transmitter relays the schedule recording command message to a broadcast receiving apparatus through wireless communication, wherein the receiver receives the broadcast data corresponding to the schedule recording command message from the broadcast receiving apparatus, through wireless communication, and wherein the receiver, transcoder, storage unit, processor and transmitter are comprised in the cloud server.

9. The cloud server of claim 8, wherein the transcoder comprises:

a decoder for dividing the broadcast data into video data and audio data, and for decoding each of the video data and the audio data;

an encoder for encoding the decoded video data and the decoded audio data into video data pieces and audio data pieces having the plurality of file formats; and a synchronizer for synchronizing the encoded video data pieces and the encoded audio data pieces, so as to generate the transcoded broadcast data pieces.

10. A broadcast output apparatus, which is connected to a cloud server and receives and outputs broadcast data, the broadcast output apparatus comprising:

a user interface for receiving a schedule recording command message for storage of the broadcast data;

a transmitter for transmitting the schedule recording command message to the cloud server, and for transmitting a broadcast request message to the cloud server when the user interface has received the broadcast request message through wireless communication;

a receiver for receiving the broadcast data, which has been transcoded into a file format used by the broadcast output apparatus and corresponds to the schedule recording command message, from the cloud server through wireless communication outside of a home network area, in accordance with a call-back function, stored in the cloud server, for outputting the broadcast data from the cloud server to the broadcast output apparatus by using an event of receiving the broadcast request message by the cloud server from the broadcast output apparatus as a trigger, wherein the broadcast data is transcoded by the cloud server, in accordance with a lookup table defining relationships between the broadcast output apparatus and the file format used by the broadcast output apparatus, and stored in the cloud server, and wherein the lookup table defines relationships between the broadcast output apparatus which sent the schedule recording command message and the file format used by the broadcast output apparatus; and an output unit for outputting the received broadcast data, wherein the schedule recording command message is relayed to a broadcast receiving apparatus by the cloud server, through wireless communication, and wherein the broadcast data corresponding to the schedule recording command message is transmitted to the cloud server from the broadcast receiving apparatus, through wireless communication.

11. The broadcast output apparatus of claim 10, wherein the broadcast data is transcoded into the file format used by the broadcast output apparatus, which is determined from among transcoded broadcast data pieces having a plurality of file formats.

12. A control method of a cloud server, the control method comprising the steps of:

receiving a schedule recording command message from a broadcast output apparatus through wireless communication;

transmitting the schedule recording command message to a broadcast receiving apparatus through wireless communication;

receiving, from the broadcast receiving apparatus, broadcast data corresponding to the schedule recording command message through wireless communication;

storing a lookup table defining relationships between the broadcast output apparatus which sent the schedule recording command message and the file format used by the broadcast output apparatus, and a call-back function for outputting the broadcast data to the broadcast output apparatus by using an event of receiving a broadcast request message from the broadcast output apparatus as a trigger;

identifying a file format used by the broadcast output apparatus by referring to the lookup table defining relationships between the broadcast output apparatus and the file format used by the broadcast output apparatus, and read out from the storage unit;

transcoding the broadcast data into the file format used by the broadcast output apparatus, using the lookup table;

storing the transcoded broadcast data; and transmitting the transcoded broadcast data to the broadcast output apparatus, when the broadcast request message is received from the broadcast output apparatus through wireless communication outside of a home network area, wherein the first and second receiving steps, first and second transmitting steps, and the identifying, transcoding and storing steps are performed by the cloud server.

13. The control method of claim 12, wherein the broadcast data has been recorded in the broadcast receiving apparatus in response to the schedule recording command message.

14. The control method of claim 12, wherein receiving the broadcast data comprises receiving the broadcast data from a broadcasting station based on the schedule recording command message.

15. The control method of claim 12, wherein transcoding the broadcast data comprises:

dividing the broadcast data into video data and audio data;
decoding each of the video data and the audio data;
identifying the file format used by the broadcast output apparatus;
encoding the decoded video data and the decoded audio data into the file format used by the broadcast output apparatus; and
synchronizing the encoded video data and the encoded audio data, so as to generate the transcoded broadcast data.

16. The control method of claim 15, wherein the broadcast request message comprises information on the file format used by the broadcast output apparatus, and
identifying the file format comprises identifying the file format used by the broadcast output apparatus by referring to the information on the file format in the broadcast request message.

17. The control method of claim 12, wherein transcoding the broadcast data comprises inserting a commercial into the broadcast data before transcoding the broadcast data into the file format.

18. The control method of claim 17, wherein the commercial is based on a pre-roll method, a mid-roll method, or a post-roll method.

19. A control method of a cloud server, the control method comprising:
receiving a schedule recording command message from a first broadcast output apparatus through wireless communication;
transmitting the schedule recording command message to a broadcast receiving apparatus through wireless communication;
receiving, from the broadcast receiving apparatus, broadcast data corresponding to the schedule recording command message through wireless communication;
storing a lookup table defining relationships between the broadcast output apparatus which sent the schedule recording command message and the file format used by the broadcast output apparatus, and a call-back function for outputting the broadcast data to the broadcast output apparatus by using an event of receiving a broadcast request message from the broadcast output apparatus as a trigger;
transcoding the broadcast data into broadcast data pieces having a plurality of file formats, in accordance with the lookup table defining relationships between the broadcast output apparatus and the file format used by the broadcast output apparatus, and read out from the storage unit, wherein the plurality of file formats differ from each other;
storing the transcoded broadcast data pieces;
when the broadcast request message is received from a second broadcast output apparatus, identifying a file format used by the second broadcast output apparatus and determining transcoded broadcast data to be transmitted, from among the transcoded broadcast data pieces; and
transmitting the transcoded broadcast data to the second broadcast output apparatus through wireless communication outside of a home network area,
wherein the first and second receiving steps, and the transmitting, transcoding, storing and identifying steps are performed by the cloud server.

20. The control method of claim 19, wherein transcoding of the broadcast data comprises:
dividing the broadcast data into video data and audio data;
decoding each of the video data and the audio data;
encoding the decoded video data and the decoded audio data into video data pieces and audio data pieces having the plurality of file formats; and
synchronizing the encoded video data pieces and the encoded audio data pieces, so as to generate the transcoded broadcast data pieces.

21. A control method of a broadcast output apparatus, which is connected to a cloud server and receives and outputs broadcast data, the control method comprising the steps of:
receiving an input of a schedule recording command message for storage of the broadcast data through wireless communication;
transmitting the schedule recording command message to the cloud server through wireless communication;
transmitting a broadcast request message to the cloud server, when the broadcast request message is received at the broadcast output apparatus through wireless communication;
receiving the broadcast data, which has been transcoded into a file format used by the broadcast output apparatus and corresponds to the schedule recording command message, from the cloud server through wireless communication outside of a home network area, in accordance with a call-back function, stored in the cloud server, for outputting the broadcast data from the cloud server to the broadcast output apparatus by using an event of receiving the broadcast request message by the cloud server from the broadcast output apparatus as a trigger,
wherein the broadcast data is transcoded by the cloud server, in accordance with a lookup table defining relationships between the broadcast output apparatus and the file format used by the broadcast output apparatus, and stored in the cloud server,
and wherein the lookup table defines relationships between the broadcast output apparatus which sent the schedule recording command message and the file format used by the broadcast output apparatus; and
outputting the receiving broadcast data,
wherein the schedule recording command message is relayed to a broadcast receiving apparatus by the cloud server, through wireless communication, and
wherein the broadcast data corresponding to the schedule recording command message is transmitted to the cloud server from the broadcast receiving apparatus, through wireless communication.

22. The control method of claim 21, wherein the broadcast data is transcoded into the file format used by the broadcast output apparatus, which is determined from among transcoded broadcast data pieces having a plurality of file formats.

23. A control method of a broadcast output system comprising a cloud server and a broadcast output apparatus, the control method comprising the steps of:
receiving, at the broadcast output apparatus, an input of a schedule recording command message for storage of the broadcast data through wireless communication;
transmitting the schedule recording command message from the broadcast output apparatus to the cloud server through wireless communication;
receiving the schedule recording command message at the cloud server from the broadcast output apparatus through wireless communication;
transmitting the received schedule recording command message at the cloud server, to a broadcast receiving apparatus, through wireless communication;
receiving, from the broadcast receiving apparatus, the broadcast data corresponding to the schedule recording command message at the cloud server through wireless communication;
storing a lookup table defining relationships between the broadcast output apparatus which sent the schedule recording command message and the file format used by the broadcast output apparatus and a call-back function for outputting the broadcast data to the broadcast output apparatus by using an event of receiving a broadcast request message from the broadcast output apparatus as a trigger;

identifying, at the cloud server, a file format used by the broadcast output apparatus by referring to the lookup table defining relationships between the broadcast output apparatus and the file format used by the broadcast output apparatus, and read out from the storage;

transcoding, at the cloud server, the broadcast data into the file format used by the broadcast output apparatus, using the lookup table;

storing the transcoded broadcast data at the cloud server;

transmitting the broadcast request message from the broadcast output apparatus to the cloud server, when the broadcast request message is received at the broadcast output apparatus through wireless communication;

transmitting the transcoded broadcast data corresponding to the broadcast request message from the cloud server to the broadcast output apparatus through wireless communication outside of a home network area;

receiving the transcoded broadcast data from the cloud server at the broadcast output apparatus; and outputting the transcoded broadcast data by the broadcast output apparatus through wireless communication.

24. A control method of a broadcast output system comprising a cloud server and at least one broadcast output apparatus, the control method comprising the steps of:

receiving an input of a schedule recording command message at a first broadcast output apparatus through wireless communication;

transmitting the schedule recording command message from the first broadcast output apparatus to the cloud server through wireless communication;

receiving the schedule recording command message at the cloud server from the first broadcast output apparatus through wireless communication;

transmitting the received schedule recording command message at the cloud server, to a broadcast receiving apparatus, through wireless communication;

receiving, from the broadcast receiving apparatus, broadcast data corresponding to the schedule recording command message at the cloud server, through wireless communication;

storing a lookup table defining relationships between the broadcast output apparatus which sent the schedule recording command message and the file format used by the broadcast output apparatus, and a call-back function for outputting the broadcast data to the broadcast output apparatus by using an event of receiving a broadcast request message from the broadcast output apparatus as a trigger;

transcoding, at the cloud server, the broadcast data into broadcast data pieces having a plurality of file formats, in accordance with the lookup table defining relationships between the broadcast output apparatus and the file format used by the broadcast output apparatus, and read out from a storage unit, wherein the plurality of file formats differ from each other;

storing the transcoded broadcast data pieces at the cloud server;

receiving the broadcast request message at a second broadcast output apparatus through wireless communication;

transmitting the broadcast request message from the second broadcast output apparatus to the cloud server through wireless communication;

when the broadcast request message is received at the cloud server from the second broadcast output apparatus, identifying a file format used by the second broadcast output apparatus and determining transcoded broadcast data to be transmitted from among the transcoded broadcast data pieces, at the cloud server;

transmitting the transcoded broadcast data from the cloud server to the second broadcast output apparatus through wireless communication outside of a home network area; and receiving and outputting the transcoded broadcast data at the second broadcast output apparatus through wireless communication.

* * * * *